Aug. 23, 1966    G. F. McGOWAN    3,267,525

COMBINATION HANDPRESS AND CURING CLAMP

Filed July 1, 1965

INVENTOR.
George F. McGowan
BY
Hovey, Schmidt, Johnson & Hovey
ATTORNEYS.

United States Patent Office 3,267,525
Patented August 23, 1966

3,267,525
COMBINATION HANDPRESS AND
CURING CLAMP
George F. McGowan, 4509 Forest Ave., Kansas City, Mo.
Filed July 1, 1965, Ser. No. 468,790
8 Claims. (Cl. 18—33)

This invention relates to an accessory for use with dental flasks in the manufacture of partial or complete dentures.

Dental flasks of the type, for example, shown in my United States Letters Patent Nos. 2,899,707 and 2,975,-479, are employed in the manufacture of dental appliances to contain the denture and an investment material during uniting of the artificial teeth and the plastic plate portion of the denture by the applicaion of heat. The steps of the various techniques of prosthetic dentistry are well known to those skilled in the art and are outlined in the aforesaid patents.

Since the dental flask must be completely closed prior to curing of the plastic plate, it has heretofore been the practice to employ a press to force the sections of the flask together into intimate contact prior to the curing process. Such presses, however, exert force on the flask that tends to be unevenly distributed and concentrated through the central portion of the investment. Thus, the finished denture has a tendency to assume an open bite configuration because, during heating of the flask, expansion of the edges or sidewalls of the flask occurs out of proportion and to a greater degree than the inner portion of the assembly.

It is, therefore, the primary object of this invention to provide a device for clamping the sections of a dental flask together during the curing process in a manner to evenly distribute the clamping pressure throughout the investment, as well as provide a means for pressing the sections together prior to curing to force the egress of excessive plastic material from within the flask.

Another object of the instant invention is to provide a handpress having means for clamping the sections of the dental flask together during the curing process to eliminate the aforesaid tendency of the finished denture to assume an open bite configuration.

Still another object of the instant invention is to provide a combination press and curing clamp employing a center screw and a pair of clamping setscrews on opposed sides of the center screw for use subsequent to operation of the center screw to clamp the sections of the flask together during curing of the plastic plate.

Yet another object of this invention is to provide such a device having a pressure plate engageable by the setscrews provided with means which concentrates the force of the screws at the sidewalls of the flask to prevent disproportionate expansion of the flask upon heating thereof during the curing process.

A further object of the invention is to provide a clamping device as aforesaid having a leveling plate for supporting the flask and maintaining the same in a stationary position during operation of the clamp.

Other objects will become apparent as the detailed description proceeds.

Figure 3:
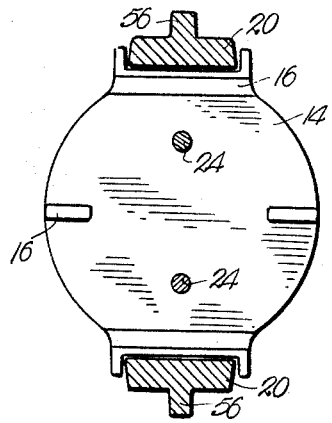
FIG. 3 is a horizontal sectional view taken along line 3—3 of FIG. 1.
Figure 4:
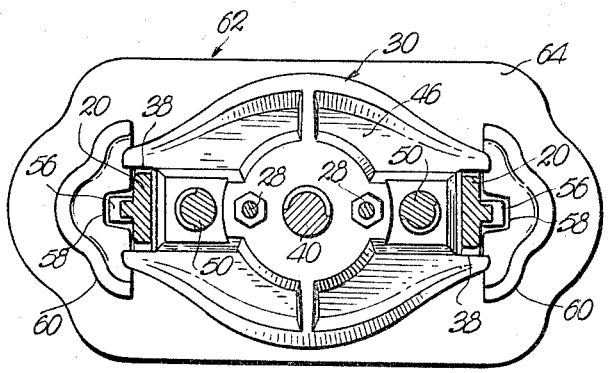
FIG. 4 is a horizontal sectional view taken along line 4—4 of FIG. 2.

The numerals 10 and 12 designate, respectively, the upper and lower sections of a two-section, open-end dental flask of the type disclosed in my U.S. Patent No. 2,975,-479. The open end of the flask is the lower end thereof, such end resting on a leveling plate 14. As may be seen in FIG. 3, plate 14 is of a generally circular configuration and is provided with four shallow, depending, peripherally spaced ribs 16 forming footings which engage a circular bed 18 integral with the lower ends of a pair of standards 20. The upper ends of standards 20 are integral with a support member or crosshead 22 which interconnects the standards and is vertically spaced from the flask.

Figure 1:
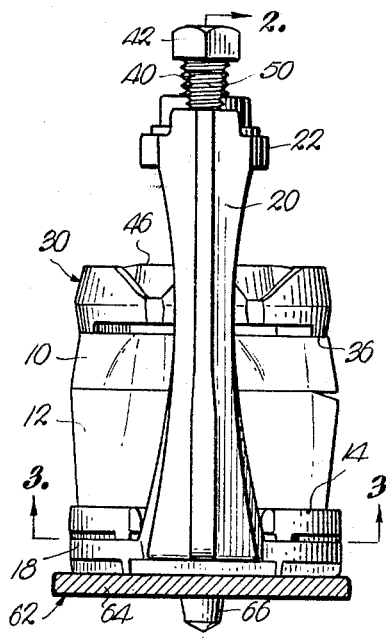
FIGURE 1 is a vertical sectional view through the platform of the bench mount showing one of the jaws thereof removed to reveal the device in side elevation.
Figure 2:
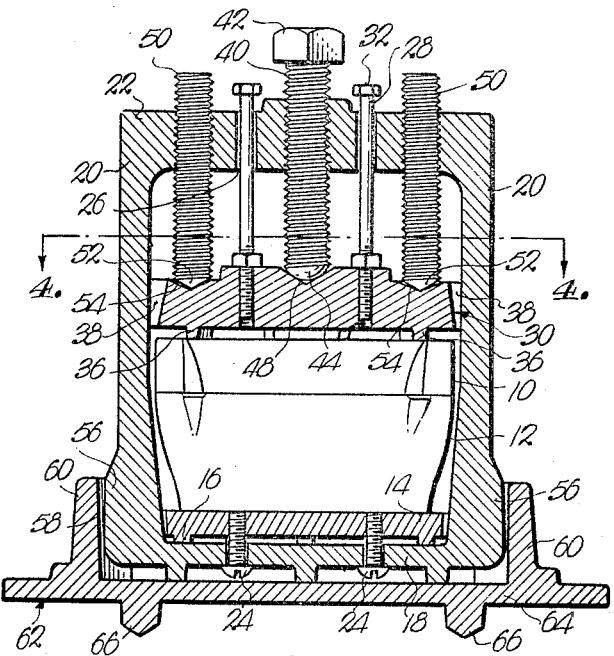
FIG. 2 is a vertical sectional view taken along line 2—2 of FIG. 1.

It will be appreciated that standards 20, bed 18 and member 22 form an open, upright, rectangular frame, a pair of threaded fasteners 24 being employed to securely seat plate 14 on bed 18. Member 22 has a pair of upright openings 26 therethrough receiving a pair of guide rods 28 which serve to suspend a pressure plate 30 beneath member 22. As is clear in FIG. 2, the lower ends of rods 28 are threaded into pressure plate 30, the upper end of each rod being provided with a head 32 which serves as a stop when the flask is removed from the device and pressure plate 30 is permitted to hang freely.

Figure 5:
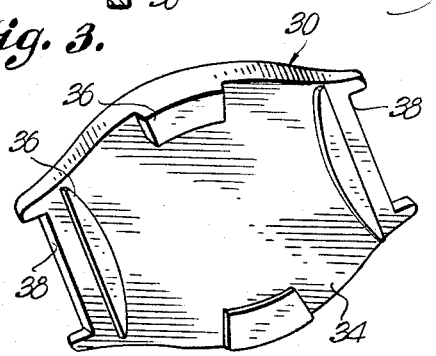
FIG. 5 is a detailed, perspective view showing the underside of the pressure plate.

The lower face 34 of pressure plate 30 is provided with four feet 36 which project downwardly therefrom for engagement with the upper surface of flask section 10. Feet 36 are spaced around the lower face 34 at approximately equal intervals as shown in FIG. 5, and disposed adjacent the edge of plate 30 in substantial alignment with the sidewalls of the flask sections 10 and 12. A pair of opposed slots 38 in pressure plate 30 receive respective standards 20 to prevent excessive lateral shifting of the plate prior to forcible engagement thereof with flask section 10.

An upright, tapped hole through the central portion of member 22 threadably receives an upright center screw 40 having a head 42 and a lower, rounded tip 44. The upper face 46 of plate 30 has a conical recess 48 in the central portion thereof which receives tip 44. A pair of diametrically opposed, tapped holes in member 22 are laterally spaced from center screw 40 and threadably receive respective setscrews 50. The lower ends 52 of setscrews 50 are of conical configuration and are received by mating conical depressions 54 in upper face 46. It should be noted that depressions 54 are vertically aligned with the feet 36 adjacent slots 38.

The lower end of each standard 20 is provided with a laterally projecting rib 56 which is received by a groove 58 in an upright jaw 60 forming a part of a bench mount assembly 62. The two jaws 60 are integral with a platform 64 and spaced apart a distance to provide a vice for confining the pressing and clamping device to prevent substantial movement thereof during operation. A pair of pins 66 depend from the underside of platform 64 for reception in corresponding holes in the surface of a workbench (not shown) to secure mounting assembly 62 to the bench.

Figure 6:
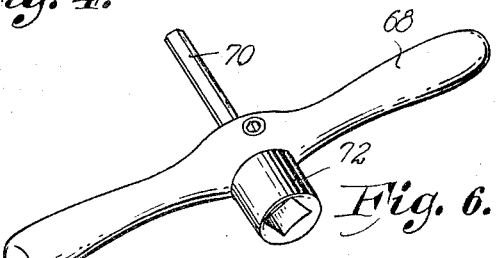
FIG. 6 is a perspective view of the combination wrench utilized to manually operate the device.

In FIG. 6 a combination wrench is illustrated for use in manually operating the center screw 40 and the setscrews 50 of the device. The wrench comprises an operating handle 68 having a male wrench part 70 extending therefrom for reception by a conjugate opening (not shown) in the upper end of each of the setscrews 50. A female wrench part 72 is also secured to handle 68 opposite part 70 and is utilized to engage the flats of head 42 to rotate center screw 40.

In operation, the invested flask is disposed on leveling plate 14 with the feet 36 of pressure plate 30 engaging the upper surface of section 10 adjacent the peripheral edge thereof. An excess of plastic material is initially loaded into the flask in order to ultimately obtain uniform density of the plate portion of the denture. Thus, the two flask sections are initially in spaced relationship and must be forced toward one another into intimate contact to eject th eexcess plastic and pack the same within the flask.

To accomplish the foregoing, wrench part 72 is utilized to rotate center screw 40 to advance the latter downwardly, thereby placing tip 44 in engagement with recess 48. It should be noted that the rounded configuration of tip 44 permits the force of the center screw to be evenly applied. As the center screw is tightened, the two flask sections move toward tight intimate contact and, during such movement, expel the excess plastic from between their opposed, marginal rims. Once the rims are in tight engagement with one another, the flask is fully closed with the investment and the denture in place therein.

In the prior art, the above operation would constitute a sufficient closing of the flask to permit the same to be placed in a curing vat where the plastic plate is cured by the application of heat thereto. However, as discussed hereinabove, if the plastic plate is allowed to cure while the flask is held together only by pressure applied through the central portion thereof, the denture has a tendency to assume an open bite configuration which, of course, would not be desired by the wearer of the denture. This is eliminated in the instant invention by the provision of the two setscrews 50 which are advanced into forcible engagement with depressions 54 by male wrench part 70 prior to removal of the device from bench mount assembly 62 and placement of the same in the curing vat.

It should be noted that depressions 54 form pressure-receiving bearing surfaces for engagement by setscrews 50 which are in substantial alignment with the sidewalls of the flask. Additionally, the two feet 36 adjacent slots 38 are directly beneath depressions 54 so that application of pressure thereto by the setscrews clamps the two flask sections 10 and 12 together by pressure which is applied at the edges of the flask rather than at the center thereof. Edge pressure is also transmitted to the flask by the other two feet 36 which aid in distributing the clamping force over the periphery of the flask. It has been found in actual practice that, after tightening of setscrews 50, center screw 40 can oftentimes be rotated by hand away from plate 30, evidencing that the compression of the flask under the action of the center screw only was not uniform and was concentrated through the central portion thereof.

If curing were allowed to take place without tightening setscrews 50, the sidewalls of the flask would be allowed to expand out of proportion to the central portion thereof, thereby tending to cause the denture to assume the open bite configuration discussed above. The edge clamping effect of setscrews 50, however, prevents this disproportionate expansion during the curing process so that expansion of the flask under the application of heat thereto will be uniform and, therefore, have no adverse effect on the configuration of the denture.

It should also be understood that leveling plate 14 serves an important function during operation of the clamp. Since the open frame will generally comprise a casting of bronze or the like, bed 18 will not present a flat upper surface because of the draw in the casting. Thus, bed 18 will be formed with a center ridge extending between standards 20. The four ribs 16, therefore, elevate plate 14 above this ridge and may be dimensioned to maintain the upper face of plate 14 horizontal. Such upper face should be machined to provide a perfectly flat surface. In this manner, the possibility of rocking movement of the flask upon closing and clamping thereof is precluded.

Additional leveling plates may be stacked on plate 14 if it is desired to accommodate shorter flasks, such as the conventional three-piece flask. When the device is employed with the two-piece flask illustrated, plate 14 supplants the lid that is utilized in three-piece flasks.

Having thus described the invention, what is claimed as new and desired to be secured by Letters Patent is:

1. For use with a dental flask having a pair of sections provided with investment-retaining sidewalls, a combination press and curing clamp comprising:
   a pair of standards;
   a bed between the standards and rigid therewith;
   a leveling plate resting on said bed for receiving said flask with one of said sections disposed thereon;
   a support member above said base and interconnecting said standards;
   a horizontal pressure plate between the leveling plate and the member having a pair of opposed, upper and lower major faces and a peripheral edge provided with opposed slots receiving respective standards,
   said lower face having a pair of feet projecting downwardly therefrom for engaging the other of said sections and disposed in substantial alignment with said walls when the flask is on the leveling plate,
   said upper face having a pair of pressure-receiving bearing surfaces vertically aligned with respective feet;
   structure on the member disposed to apply downward force to the central portion of said upper face to shift the pressure plate toward said leveling plate, whereby to apply pressure to said sections to force the same into intimate contact when the flask is on the leveling plate; and
   a pair of upright setscrews threaded in said member and aligned with respective surfaces for engaging the latter to force the pressure plate toward the leveling plate and thereby clamp the flask between said feet and said leveling plate when the flask is disposed thereon, whereby to prevent disproportionate expansion of the flask upon heating thereof during the curing process.

2. The invention of claim 1, wherein each of said setscrews has a lower end of conical configuration, each of said surfaces presenting a conical depression in said upper face for receiving the lower end of the corresponding setscrew, said structure comprising an upright center screw between the setscrews having a rounded, lower tip, said upper face having a conical recess therein for receiving said tip.

3. The invention of claim 1, wherein said member has a pair of spaced-apart, upright openings therethrough, and wherein is provided a pair of upright guide rods received in respective openings and connected to said plate for suspending the latter beneath the member.

4. A press for closing and packing a sectional dental flask provided with investment-retaining sidewalls, said press comprising:
   a flask-supporting base;
   a crosshead spaced from the base;
   means interconnecting the base and the crosshead;
   a rigid pressure plate between the base and the crosshead;
   a pressure applying element mounted on the crosshead and disposed for engagement with the central portion of said plate to force the plate against the flask when the latter is on the base; and
   structure on the plate spaced outwardly of said portion for transmitting the pressure to the flask exclusively at the periphery thereof to direct the pressure downwardly through said sidewalls when the flask is clamped between the plate and the base.

5. The invention of claim 4, and means suspending the plate from the crosshead for movement between the latter and the base.

6. The invention of claim 4, said base including a bed presenting an upper surface, and a leveling plate resting on said surface, said interconnecting means being rigid with said bed, said leveling plate having a flat, flask-engaging upper face and a plurality of depending footings engaging said surface and disposed to maintain said face in an attitude with respect to said pressure plate capable of equalizing the distribution of the force applied to the flask by the pressure plate when the flask is received between the pressure plate and said face.

7. The invention of claim 4, said structure including a plurality of feet projecting from said pressure plate toward said base for engagement with said flask at said periphery thereof.

8. A press for closing and packing a sectional dental flask comprising:
 a flask-supporting base;
 a crosshead spaced from the base;
 means interconnecting the base and the crosshead;
 a pressure plate between the base and the crosshead; and
 pressure means mounted on the crosshead and disposed for engagement with the plate to force the plate against the flask when the latter is on the base,
 said base including a bed presenting an upper surface, and a removable leveling plate resting on said surface,
 said interconnecting means being rigid with said bed,
 said leveling plate having a flat, flask-engaging upper face and a plurality of depending footings engaging said surface and disposed to maintain said face in a level attitude regardless of irregularities in said surface.

References Cited by the Examiner
UNITED STATES PATENTS

| | | | |
|---|---|---|---|
| 163,755 | 5/1875 | Edson | 18—33 |
| 248,022 | 10/1881 | Campbell | 18—33 |
| 546,465 | 7/1895 | Griswold | 18—33 |
| 706,016 | 8/1902 | Brewer et al. | 18—33 |
| 731,030 | 6/1903 | Finn | 18—33 |
| 1,540,300 | 6/1925 | Altman et al. | 18—33 |
| 1,724,691 | 8/1929 | Andresen | 18—33 |
| 1,875,596 | 9/1932 | Hazeltine | 18—33 |
| 2,013,368 | 9/1935 | Trusler | 18—33 |

WILLIAM J. STEPHENSON, *Primary Examiner.*